US009078807B2

(12) United States Patent
Narasaki et al.

(10) Patent No.: US 9,078,807 B2
(45) Date of Patent: Jul. 14, 2015

(54) TABLET COMPRESSION MACHINE

(75) Inventors: Masahiko Narasaki, Yamaguchi (JP); Tomoya Akutagawa, Yamaguchi (JP); Takamasa Maki, Osaka (JP); Minoru Uemura, Kyoto (JP)

(73) Assignee: Teijin Pharma Limited, Tokyo (JP)

( * ) Notice: Subject to any disclaimer, the term of this patent is extended or adjusted under 35 U.S.C. 154(b) by 0 days.

(21) Appl. No.: 12/527,084

(22) PCT Filed: Feb. 15, 2008

(86) PCT No.: PCT/JP2008/053007

§ 371 (c)(1), (2), (4) Date: Sep. 4, 2009

(87) PCT Pub. No.: WO2008/099973

PCT Pub. Date: Aug. 21, 2008

(65) Prior Publication Data

US 2010/0092596 A1 Apr. 15, 2010

(30) Foreign Application Priority Data

Feb. 16, 2007 (JP) ................................ 2007-037156

(51) Int. Cl.
*B29C 43/06* (2006.01)
*A61J 3/10* (2006.01)
(Continued)

(52) U.S. Cl.
CPC ... *A61J 3/10* (2013.01); *B30B 7/04* (2013.01); *B30B 11/027* (2013.01); *B30B 15/065* (2013.01)

(58) Field of Classification Search
CPC ...... B30B 7/04; B30B 11/027; B30B 11/265; B30B 11/03; B30B 15/065; A61J 3/104
USPC .................. 425/78, 330, 344-345, 352, 356; 100/232
See application file for complete search history.

(56) References Cited

U.S. PATENT DOCUMENTS 3,096,248 A 7/1963 Rudzki
4,536,366 A * 8/1985 Inoue ............................. 419/11
(Continued)

FOREIGN PATENT DOCUMENTS

JP 59-47097 A 3/1984
JP 3-232819 A 10/1991
(Continued)

OTHER PUBLICATIONS

International Search Report of PCT/JP2008/053007 dated Apr. 1, 2008.
(Continued)

*Primary Examiner* — Joseph S Del Sole
*Assistant Examiner* — Thukhanh T Nguyen
(74) *Attorney, Agent, or Firm* — Sughrue Mion, PLLC

(57) ABSTRACT

A tablet compression machine which can manufacture a tablet having a plurality of layers by applying secondary compression molding to a columnar primary compression molded product formed by a plurality of layers and whose two bottom faces may be bulged, comprising at least a mortar, an upper pestle, and a lower pestle, in which the mortar is substantially in a shape in which a part of a flat plate is punched by a closed curve in a direction perpendicular to a plane of the flat plate, the upper and lower pestles are in a shape fitted with an inner face of the mortar, a space formed by an inner face of the mortar, a lower face of the upper pestle, and an upper face of the lower pestle is in a shape of an intended tablet in the secondary compression molding, a dent formed by the inner face of the mortar and the upper face of the lower pestle can constitute a shape suitable for receiving the primary compression molded product, and a direction of the secondary compression molding is different from the compression molding direction of the primary compression molded product. According to such a tablet compression machine, a multilayer tablet in a shape having a multilayer structure and not limited to columnar can be manufactured.

2 Claims, 6 Drawing Sheets

(51) Int. Cl.

| | |
|---|---|
| ***B30B 7/04*** | (2006.01) |
| ***B30B 11/02*** | (2006.01) |
| ***B30B 15/06*** | (2006.01) |

(56) References Cited

U.S. PATENT DOCUMENTS

| | | | | |
|---|---|---|---|---|
| 4,559,195 | A * | 12/1985 | Heggenstaller | 264/120 |
| 4,732,556 | A * | 3/1988 | Chiang et al. | 425/405.2 |
| 5,088,915 | A * | 2/1992 | Korsch et al. | 425/345 |
| 5,246,638 | A * | 9/1993 | Goldberger | 425/78 |
| 5,391,378 | A | 2/1995 | Sanderson | |
| 6,371,746 | B1 * | 4/2002 | Shiomi et al. | 425/78 |
| 6,986,866 | B2 * | 1/2006 | Gubanich et al. | 425/78 |
| 7,156,631 | B2 * | 1/2007 | Ozeki | 425/345 |
| 7,713,455 | B2 * | 5/2010 | Ozeki et al. | 425/345 |
| 2004/0113319 | A1 * | 6/2004 | Kondo et al. | 425/354 |
| 2005/0220824 | A1 | 10/2005 | Teckoe et al. | |

FOREIGN PATENT DOCUMENTS

| | | | |
|---|---|---|---|
| JP | 6-9375 | A | 1/1994 |
| JP | 9-206997 | A | 8/1997 |
| JP | 2001-293599 | A | 10/2001 |
| JP | 2002-65812 | A | 3/2002 |
| JP | 2005-529645 | A | 10/2005 |
| JP | 2006-095619 | A | 4/2006 |
| JP | 2006-315076 | A | 11/2006 |
| WO | 03/026560 | A1 | 4/2003 |

OTHER PUBLICATIONS

European Search Report for corresponding Application No. 08711781.8 dated Jun. 12, 2013.

Chinese Office Action for Application No. 200880005113.3 dated Jan. 17, 2014.

* cited by examiner

TABLET COMPRESSION MACHINE

CROSS REFERENCE TO RELATED APPLICATION

This application is a National Stage of International Application No. PCT/JP2008/053007 filed Feb. 15, 2008, claiming priority based on Japanese Patent Application No. 2007-037156,filed Feb. 16, 2007, the contents of all of which are incorporated herein by reference in their entirety.

TECHNICAL FIELD

The present invention relates to a tablet compression machine that can manufacture tablets having a multilayer structure by performing secondary compression molding on a primary compression molded tablet from a direction different from that of primary compression.

BACKGROUND ART

As a tablet having a multilayer structure, tablets having a substantially columnar shape and layers in the columnar direction (center axis direction of the column) are known. This type of tablets is manufactured by compression molding from the columnar direction. These tablets are useful as tablets for combination medicament which hold a plurality of drugs in a single tablet, but there is a problem that the shape of the tablet is limited to columnar or the like due to limitation caused by the above-mentioned manufacturing method.

A tablet having such a structure can be used as a scored tablet of the same drug, but application is difficult in view of a difficulty in division caused by difficulty in giving a splitting groove or the limitation on the shape to a column.

As another tablet having a multilayer structure, a core tablet having a core inside the tablet is known, and this is useful as a tablet for combination medicament or a scored tablet, but there is also a problem such as constraint on a thickness of the tablet, complexity of a tableting machine and the like caused by necessity to insert the core. In manufacture of this type of tablets, compression from a different direction is not performed as disclosed in the International Publication No. WO03/026560.

As a special tablet having a multilayer structure, a tablet in which fractions of molded products are joined physically or chemically is disclosed in Japanese Patent Laid-Open Publication No. 6-9375. This can be used as a tablet for combination medicament or scored tablet, but there are problems that provision of a physical shape or addition of an adhesive layer for binding is required, a device and a process for binding are required and the like. And the molding is performed not by compression but by adhesion.

Compression is performed several times in tablet compression in many cases, but this is performed in the same direction, and its major purpose is to increase strength of the tablet after compression molding by expelling air existing between particles.

It is known in general that further compression to the primary compression molded product which might change its shape causes irreversible destruction of the molded product, and compression from a different direction is not carried out.

That is, manufacture of a tablet by performing compression molding again to a compression molded product containing those having a multilayer structure from a direction different from the compression direction has not been carried out and thus, a tablet compression machine for that purpose has not been known. Therefore, the tablets for combination medicament or scored tablets have their shapes limited, and manufacture thereof requires complicated devices and processes, which is a problem.

DISCLOSURE OF THE INVENTION

An object of the present invention is to provide a tablet compression machine which can manufacture a multilayer tablet having a shape not limited to columnar despite the multilayer structure by performing secondary compression molding from a direction different from the direction of primary compression molding, does not have a complicated structure and does not require a complicated process.

The above object can be achieved by a tablet compression machine which can manufacture a tablet having a plurality of layers by applying secondary compression molding to a columnar primary compression molded product whose two bottom faces may be bulged, comprising at least a mortar, an upper pestle, and a lower pestle, in which the mortar is substantially in a shape in which a part of a flat plate is punched by a closed curve in a direction perpendicular to a plane of the flat plate, the upper and lower pestles are in a shape fitted with an inner face of the mortar, a space formed by an inner face of the mortar, a lower face of the upper pestle, and an upper face of the lower pestle is in a shape of an intended tablet in the secondary compression molding, a dent formed by the inner face of the mortar and the upper face of the lower pestle can constitute a shape suitable for receiving the primary compression molded product, and a direction of the secondary compression molding is different from the compression molding direction of the primary compression molded product.

The above object can be particularly suitably achieved by a rotary tablet compression machine in which the shape of the upper face of the lower pestle includes a shape curved so that an outer edge portion comes to an upper part and the lower pestle and the mortar fitted with that are mounted on a turntable, in which a direction of a trough portion formed by being curved is a tangent direction of a rotary motion of the turntable.

According to the tablet compression machine of the present invention, a multilayer tablet such as a tablet for combination medicament and a scored tablet whose shapes are not limited can be manufactured without requiring a complicated device or process.

EXPLANATION OF REFERENCE NUMERALS

Figure 1:
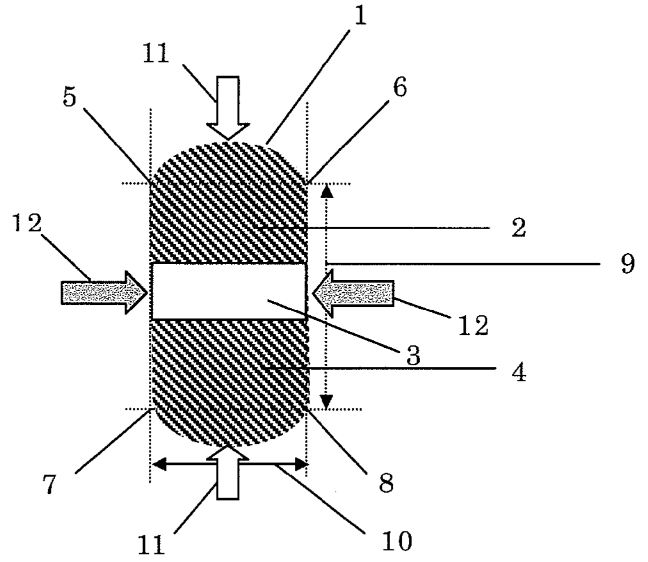
FIG. 1 is a sectional view illustrating an example of a primary compression molded product offered for a tablet compression machine of the present invention.

1 primary compression molded product
2 drug containing layer
3 additive layer
4 drug containing layer
5 point corresponding to projected rectangle on column
6 point corresponding to projected rectangle on column
7 point corresponding to projected rectangle on column
8 point corresponding to projected rectangle on column
9 height of columnar portion
10 diameter of columnar portion
11 direction of primary compression
12 direction of secondary compression
13 mortar having an elliptic columnar inner face
14 gap from point corresponding to projected rectangle on column of primary compression molded product to the closest portion in mortar or lower pestle
15 gap from point corresponding to projected rectangle on column of primary compression molded product to the closest portion in mortar or lower pestle
16 gap from point corresponding to projected rectangle on column of primary compression molded product to the closest portion in mortar or lower pestle
17 gap from point corresponding to projected rectangle on column of primary compression molded product to the closest portion in mortar or lower pestle
18 lower pestle
19 portion where height of mortar exceeds height of primary compression molded product
20 projection
21 turntable
22 direction of trough portion on upper face of lower pestle
23 tangent direction of rotary motion of turntable
24 scored line
25 distance from boundary face between first layer and second layer to scored line
26 distance from boundary face between third layer and second layer to scored line

BEST MODE FOR CARRYING OUT THE INVENTION

A primary compression molded product to become a target of tablet compression, that is, secondary compression molding by a tablet compression machine of the present invention has substantially a shape of a column, whose two bottom faces may have bulged portions.

Specifically, the shape is basically a column made of columnar layers containing or not containing drug stacked in plural, but its one or two bottom faces may have bulged portions on the outside. Such bulged portions typically include a bulged portion in a shape forming a part of a spherical face, but it may be another shape as long as it can be made by a dent on an upper face of a lower pestle or a lower face of an upper pestle used in the primary compression molding. The term "columnar" is used here, but the shape does not have to be a geometrically strict column but an elliptic column close to a column can be a primary compression molded product to become a target of the tablet compression machine of the present invention.

The drug contained by the primary compression molded product may be one type or several types depending on the purpose. The type of the drug or content does not matter as long as it does not disable secondary compression molding performed by the tablet compression machine of the present invention.

Specifically, there can be an example in which a layer containing drug is divided by an additive layer not containing drug. Particularly, if a target tablet is a tablet for combination medicament, different drugs are contained in different layers, while if the target tablet is a scored tablet, the same drugs are contained in the different layer. Preferable example of such a product if a target tablet is a tablet for combination medicament is a three-layered columnar one in which two drug containing layers (2 and 4 in FIG. 1) containing two types of different drugs whose physical contact between them is not preferable, respectively, are divided by a single additive layer not containing drug (3 in FIG. 1). Also, if the target tablet is a scored tablet, the product can be a three-layered columnar product in which two drug containing layers (2 and 4 in FIG. 1) containing the same drug are divided by a single additive layer not containing drug (3 in FIG. 1). Such primary compression is applied in a columnar direction (11 in FIG. 1).

The tablet compression machine of the present invention has at least a mortar, an upper pestle, and a lower pestle. A dent formed by an inner face of the mortar and an upper face of the lower pestle receives the primary compression molded product. That is, one of morphological characteristics of the tablet compression machine of the present invention is that the dent formed by the inner face of the mortar and the upper face of the lower pestle has a shape suitable for receiving the primary compression molded product supplied from a turntable mounted on the tablet compression machine of the present invention, for example. Here, the shape suitable for receiving means not only that the primary compression molded product can be contained in the dent but that a probability of being held at a predetermined position in the dent is practically and sufficiently high so that the shape of the intended secondary compression molded product can be finally attained. Since the lower pestle can move vertically in the mortar, a depth of such a dent can be changed. Usually, the depth is set shallow in receiving of primary compression molded product and deep in tablet compression. The shape of the dent formed by the inner face of the mortar and the upper face of the lower pestle in the present invention may be such that a shape suitable for receiving can be constituted in receiving of the primary compression molded product.

On the other hand, in the secondary compression molding, a space formed by the inner face of the mortar, the lower face of the upper pestle, and the upper face of the lower pestle becomes the final shape of the intended tablet. That is, the shapes of the mortar, the upper pestle, and the lower pestle are determined by calculating back the shape of an intended tablet. For example, a shape of a low profile elliptic column and a rugby ball shape can be cited. However, the shape of the dent formed by the inner face of the mortar and the upper face of the lower pestle has limitation that a shape suitable for receiving the primary compression molded product should be constituted as mentioned above, and both conditions need to be satisfied. Also, the shape of the inner face of the mortar should be able to move vertically in a state where the upper pestle and the lower pestle are in contact with that.

From the above, the mortar needs to have a shape substantially punched with a closed curve on a part of a flat plate in a direction perpendicular to the plane of the flat plate, but the shape of a portion other than the mortar inner face is not essential and can be determined as appropriate considering easiness of manufacture, easiness to be mounted on the turntable, costs of required members and the like.

Such a closed curve is preferably a closed curve on the plane. In that case, it means that the closed curve is placed in a state parallel with a flat plate to be punched and the plate is punched with the closed curve in a direction perpendicular to the flat plate. However, the term “punching” is an expression for convenience to explain the shape of the mortar and does not mean that the manufacture must be actually made by punching. A method of manufacturing the mortar is not limited at all.

Figure 3:
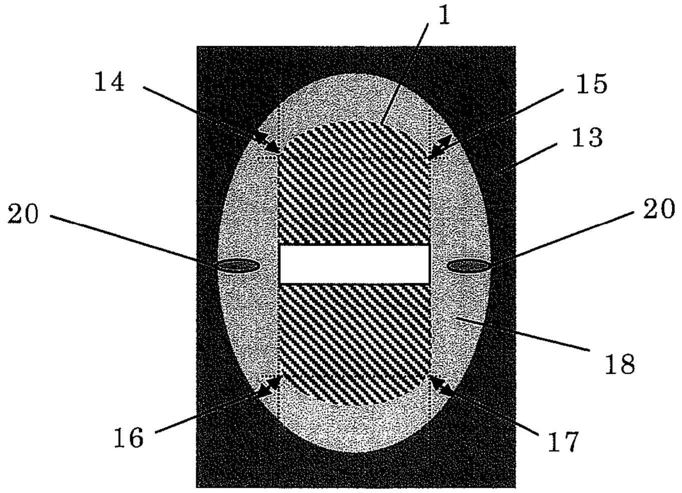
FIG. 3 is a plan view illustrating an example of a shape of a mortar in the tablet compression machine of the present invention. It is shown along with the primary compression molded product.

Particularly, such a closed curve is preferably symmetrical and is more preferably symmetrical vertically and horizontally. Such a curve includes a shape such as an ellipse (13 in FIG. 3) and a shape formed by expanding a short side of a rectangle outward in an arc state.

Figure 4:
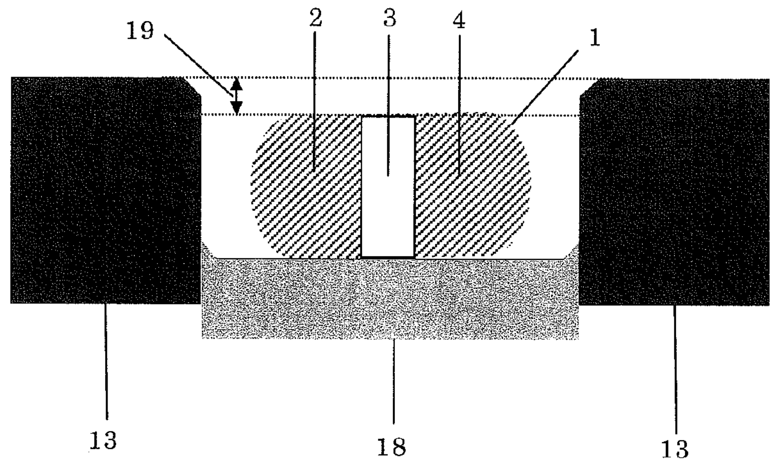
FIG. 4 is a sectional view illustrating an example of the mortar and a lower pestle of the tablet compression machine of the present invention seen from a horizontal direction perpendicular to a columnar direction. It is shown along with the primary compression molded product.

Also, the mortar in the present invention may have an inclined portion cut off in a slope state so that an opening portion at an upper part in the inner face is expanded (See the upper part of 13 in FIG. 4).

The direction of the secondary compression molding is not limited as long as the secondary compression molded product with an intended shape is obtained but it is preferably perpendicular to the compression molding direction of the primary compression molded product. That is, structures of the mortar, the upper pestle, and the lower pestle are designed preferably so that the compression direction by the upper pestle is perpendicular to the columnar direction of the primary compression molded product when the dent formed by the inner face of the mortar and the upper face of the lower pestle receives and holds the primary compression molded product (12 in FIG. 1). Among them, the direction of the secondary compression molding is particularly preferably downward in the vertical direction, and in that case, the columnar direction of the primary compression molded product is fixed to the horizontal direction. However, even if the direction of the secondary compression molding is not perpendicular to the compression molding direction of the primary compression molded product, the structure of the dent formed by the inner face of the mortar and the upper face of the lower pestle is preferably designed so that the columnar direction of the primary compression molded product is fixed to the horizontal direction.

Among those designed such that the columnar direction of the primary compression molded product is fixed to the horizontal direction, the shape of the dent formed by the inner face of the mortar and the upper face of the lower pestle preferably has an interval (gap) from each of four points on the column corresponding to four apexes of a rectangle obtained by projecting a columnar portion of the primary compression molded product on a horizontal plane, when the primary compression molded product is received, to the closest portion of the mortar or lower pestle of −1 mm to 1 mm. That is, in a state where the primary compression molded product is received, when a parallel light is projected downward in the vertical direction, if the interval from each of the four points (5, 6, 7, 8 in FIG. 1) on the column corresponding to the four apexes of the rectangle which would be projected on the virtual horizontal plane to the closest portion in the dent formed by the inner face of the mortar and the upper face of the lower pestle is −1 mm to 1 mm, the primary compression molded product is fixed in an intended orientation in the dent and highly likely molded as intended, which is preferable (14, 15, 16, 17 in FIG. 3). More preferably, the interval is −0.5 to 0.5 mm.

Here, the negative numeral value of the interval means that if a drawing in a state where the product is placed on the upper face of the lower pestle such that it is buried in the lower pestle or the inner face of the mortar on a cubic drawing, even though the product is actually too big to be placed on the upper face of the lower pestle, the negative value is the shortest distance from the four points to the lower pestle or the inner face of the mortar. Actually, even if the primary compression molded product is placed on the mortar, the size is too big to reach the upper face of the lower pestle but placed on an edge of the mortar, but if the numeral value is within the above range, when tablet compression is performed by the upper pestle, it is highly likely that the intended secondary compression molded product can be obtained finally.

Figure 5:
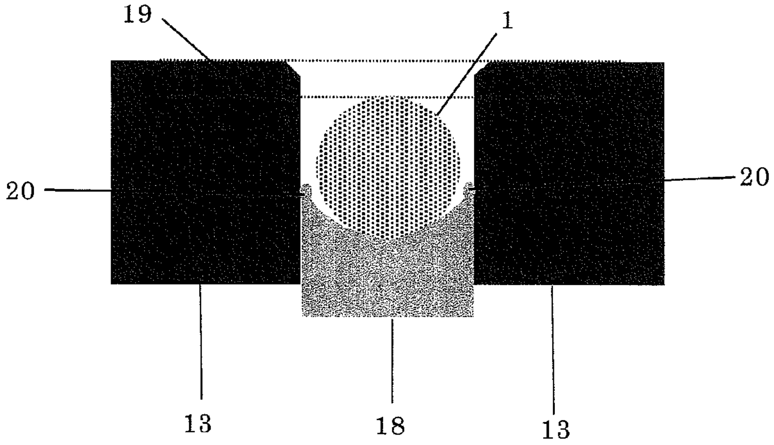
FIG. 5 is a sectional view illustrating an example of the mortar and the lower pestle of the tablet compression machine of the present invention seen from the columnar direction. It is shown along with the primary compression molded product.

On the other hand, the depth of the dent formed by the inner face of the mortar and the upper face of the lower pestle in the secondary compression molding is preferably a value larger than a height (that is, a diameter of the columnar portion) of the primary compression molded product. If the opening portion on the upper part on the inner face of the mortar has the inclined portion as mentioned above, calculation is made supposing that such an inclined portion does not exist. Also, the depth is calculated from the lowest portion when the primary compression molded product is placed on the upper face of the lower pestle (including a case as above that the primary compression molded product is actually too big to be placed, it is assumed that the product could be placed). That is, in a state where the primary compression molded product is fixed to the dent, the upper end portion is located lower than the edge of the dent (19 in FIGS. 4 and 5). As a result, it is also highly likely that the intended secondary compression molded product can be obtained. A preferable range of the depth of the dent is also applicable to the shape of a dent formed by any of the mortar inner face and the upper face of the lower pestle described above.

The shape of the upper face of the lower pestle preferably includes the shape curved so that the outer edge portion comes to the upper part. For example, a shape in which an outer edge portion of an ellipse is curved upward or a shape in which two opposing sides of a rectangle are curved so that the both ends come to the upper part can be cited. In the case of the shape with the outer edge portion of an ellipse curved upward, a curved shape in which two points in the short diameter direction of the ellipse come to the upper part, for example, can be cited. In this case, a trough portion is formed in the longer diameter direction. In the case with the two opposing sides of a rectangle curved so that the both ends come to the upper part, the two opposing sides of the rectangle keep a parallel state, and a trough parallel with them is formed between the two sides of the rectangle. Such trough portions become bottoms and the shape of the upper face of the lower pestle is determined so that the two sides have the same height. And the primary compression molded product is received with the columnar direction matching the direction of the trough portions. However, the shape of the curved ellipse or rectangle is referred to, here, mainly for the purpose of explanation of the shape of the lower-pestle upper face, and it is not particularly necessary to mount a member in a curved ellipse or rectangle. The curvature may be such that a curve crossing a plane perpendicular to the direction of the trough portion is an arc, elliptic arc or parabola, but not limited to them as long as the primary compression molded product can be appropriately received. Also, the curvature can be optimized as appropriate by any of those skilled in the art.

Among them, a length of the trough portion formed by curvature is preferably −1 to 1 mm with respect to the length of the columnar portion of the primary compression molded product and this value is more preferably—0.5 to −0.5 mm. Out of this range, an intended tablet might not be molded appropriately such that the secondary compression is applied in the same direction as the columnar direction of the primary compression molded product. Those with this value in negative have a columnar portion side face of the primary compression molded product longer than the trough portion, which is a floated state (including a case in which the product is too big to be placed on the upper face of the lower pestle to begin with, but it is assumed that the product could be placed as mentioned above), but it is highly likely that the intended secondary compression molded product can be obtained in the end.

Since the shape of the upper face of the lower pestle "includes" the shape in which the outer edge portion of an ellipse or the two opposing sides of a rectangle are curved so that the both ends come to the upper part, for example, another shaped face continuing to that may be added to the upper face of the lower pestle. Particularly, a face in smooth contact with the mortar inner face is preferably provided in a long-diameter direction of the ellipse or an extension direction of the opposing two sides of the rectangle (upper right and left parts of 18 in FIG. 4, for example).

The shape of the upper face of the lower pestle described here also applies to the shape of any of the dent formed by the mortar inner face and the upper face of the lower pestle having been described above.

In order to provide a scored line or a groove for splitting to a tablet so as to have a scored tablet, for example, a projection may be provided both or one of the upper and lower pestles used for the secondary compression. Such a projection is preferably provided at a location where the outer edge portion of an elliptic shape curved so that the outer edge portion in the short-diameter direction comes to the upper part is opposed or a location at the two opposing sides of the curved rectangle.

Such a projection is also effective for, other than the above purposes, positioning of the primary compression molded product for the secondary compression molding of the primary compression molded product at an appropriate position. The position of this projection is determined in conformity with a splitting position if provision of a scored line or a groove for splitting is a major purpose. For example, if a splitting groove is to be provided in an intermediate layer of a dual-scored tablet made from three layers, two projections in total are preferably provided at the highest portion in the curved elliptic shape so that the outer edge portion in the short-diameter direction comes to the upper part or one each at the center parts of two opposing sides of the rectangle. The same applies from the viewpoint of positioning (20 in FIGS. 3 and 5). The shape, width and length of these projections are not particularly limited as long as they do not interfere with tablet molding and can be those used in manufacture of a usual scored tablet, for example.

Figure 6:
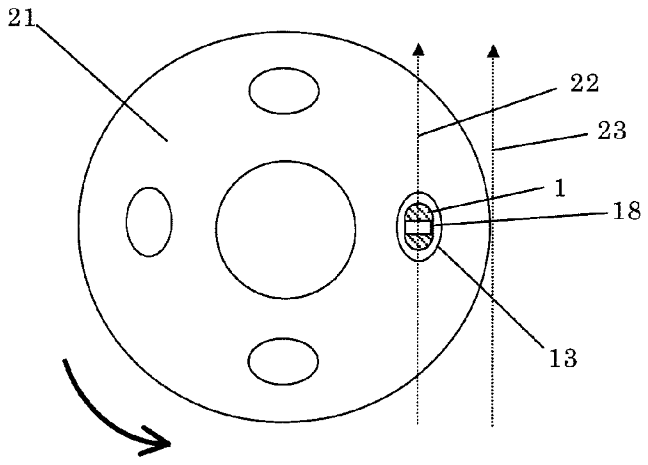
FIG. 6 is a plan view of a state in which a rotary tablet compression machine is arranged on a turntable.

The tablet compression machine of the present invention is usually applied as a rotary tablet compression machine having a turntable. In this case, the mortar is mounted on the turntable (21 in FIG. 6) and compressed and molded by the upper and lower pestles. In this rotary tablet compression machine, too, the above-mentioned preferable mode of the mortar, upper pestle and lower pestle applies as it is, but if the shape of the upper face of the lower pestle in the tablet compression machine of the present invention includes the shape in which the outer edge portion is curved so as to come to the upper part, the mortar is preferably mounted so that the direction of the trough portion (22 in FIG. 6) formed by curvature is a tangent direction of a rotary motion of the turntable (23 in FIG. 6). Other than this direction, a tablet might not be molded appropriately such that the secondary compression is applied in the same direction as the columnar direction of the primary compression molded product.

The mortar may be manufactured by integral molding with the turntable instead of being mounted on the turntable.

Figure 2:
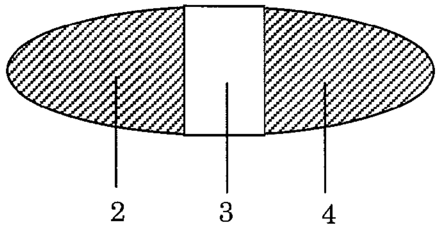
FIG. 2 is a sectional view illustrating an example of a tablet (that is, a secondary compression molded product) manufactured by the tablet compression machine of the present invention.

A typical example of the tablet manufactured by the tablet compression machine of the present invention is shown in FIG. 2. FIG. 2 shows a tablet manufactured in a case where the primary compression molded product is three-layer columnar (FIG. 1) and the secondary compression is applied to a direction (12 in FIG. 1) perpendicular to the columnar direction (layers 2, 3, 4 in FIG. 1 become layers 2, 3, 4, respectively, in FIG. 2 by the secondary compression).

EXAMPLE

The present invention will be described below in more detail referring to examples, but the present invention is not limited to the examples.

Example 1

In a primary compression molded product having three layers in the columnar direction and prepared by tablet compression in the columnar direction, the one (FIGS. 7 to 10) having a constant diameter (4.50 mm) of the columnar portion and a length in the various columnar directions (6.62 mm to 7.20 mm) is placed on the lower pestle in the mortar (FIG. 11) having an elliptic shape with a constant size so that the columnar direction becomes the horizontal direction, and a secondary compression molded product is manufactured by tablet compression with the upper and lower pestles. At this time, the upper pestle having a projection for giving a scored line is used so that a scored line (24 in FIG. 12) is given at the center line of the tablet. Also, accuracy of the secondary compression is evaluated using displacement of the intermediate layer (3 in FIG. 12) with respect to the position of the scored line as an index (See Table 1). The result is shown in Table 2.

TABLE 1

Figure 12:
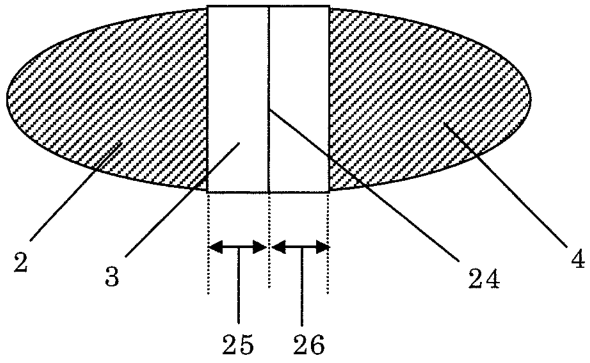
FIG. 12 is a sectional view of a tablet determined as A by a determination reference in the first embodiment.
Figure 13:
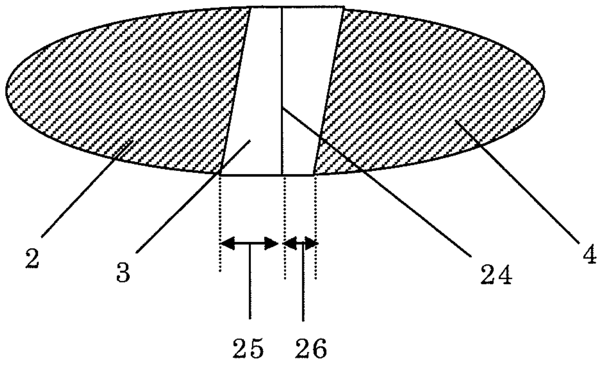
FIG. 13 is a sectional view of a tablet determined as B by a determination reference in the first embodiment.

| Determination | Reference | Reference Drawing |
|---|---|---|
| A | The intermediate layer satisfies 0.5 mm from the scored line (25 and 26 in FIG. 12) and is parallel with the scored line. | FIG. 12 |
| B | The intermediate layer is less than 0.5 mm and larger than 0.5 mm (25 and 26 in FIG. 13) and is parallel or diagonal to the scored line. | FIG. 13 |

TABLE 1-continued

Figure 14:
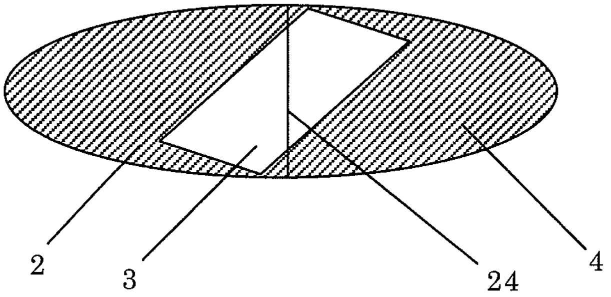
FIG. 14 is a sectional view of a tablet determined as C by a determination reference in the first embodiment.

| Determination | Reference | Reference Drawing |
|---|---|---|
| C | A part of the intermediate layer is not on the scored line. | FIG. 14 |
| D | The primary compressed tablet is compressed in the same direction as that of the primary tablet compression. | — |

TABLE 2

| Longer axis of primary compression molded product | Number of inspected products | Determination A | Determination B | Determination C | Determination D |
|---|---|---|---|---|---|
| 6.62 mm (FIG. 7) | 1,000 pieces | 834 pieces | 141 pieces | 7 pieces | 18 pieces |
| 6.90 mm (FIG. 8) | 1,000 pieces | 957 pieces | 31 pieces | 5 pieces | 7 pieces |
| 7.10 mm (FIG. 9) | 1,000 pieces | 838 pieces | 155 pieces | 6 pieces | 1 piece |
| 7.20 mm (FIG. 10) | 500 pieces | 366 pieces | 130 pieces | 4 pieces | 0 piece |

Figure 7:
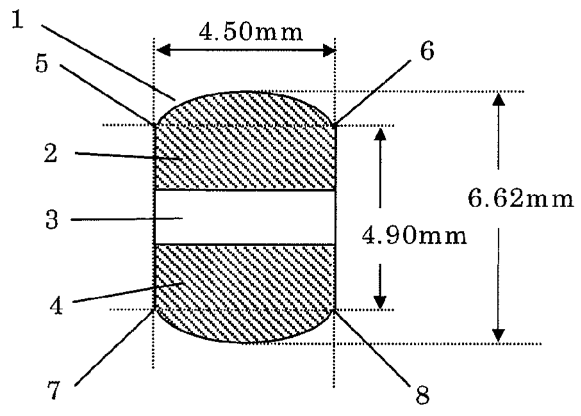
FIG. 7 is a sectional view of a primary compression molded product (length in the columnar direction: 6.62 mm) offered for the tablet compression machine in a first embodiment.
Figure 8:
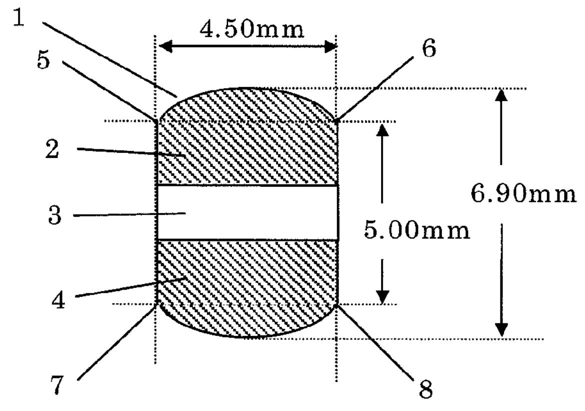
FIG. 8 is a sectional view of a primary compression molded product (length in the columnar direction: 6.90 mm) offered for the tablet compression machine in the first embodiment.
Figure 9:
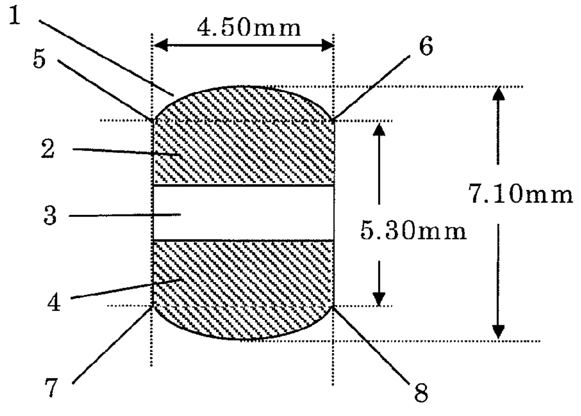
FIG. 9 is a sectional view of a primary compression molded product (length in the columnar direction: 7.10 mm) offered for the tablet compression machine in the first embodiment.
Figure 10:
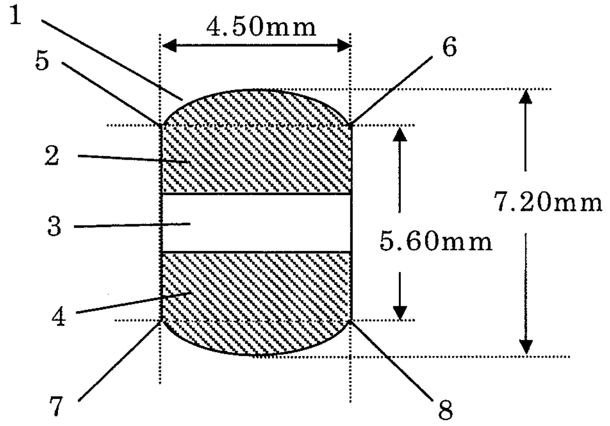
FIG. 10 is a sectional view of a primary compression molded product (length in the columnar direction: 7.20 mm) offered for the tablet compression machine in the first embodiment.
Figure 11:
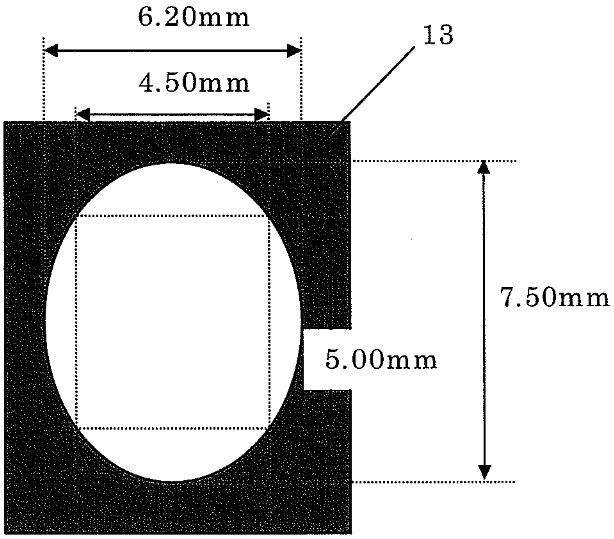
FIG. 11 is a sectional view by a horizontal plane of the mortar of the tablet compression machine of the present invention in the first embodiment.

If the longer axis of the primary compression molded product is 6.90 mm, the number of determinations A is the largest, meaning that the accuracy of the secondary tablet compression is the highest. When the sizes of the primary compression molded product and the mortar are compared at this time, the above-mentioned four points (5 to 8 in FIG. 9) in the primary compression molded product are just in contact with the four points in the mortar (FIG. 11). If the interval between the mortar and the four points of the primary compression molded product when the primary compression molded product is placed so that the columnar direction becomes the horizontal direction is smaller (−0.2 mm: FIG. 9, −0.4 mm: FIG. 10) or larger (+0.1 mm: FIG. 7) than 0 mm, the secondary tablet compression accuracy is lowered. Here, the negative numeral value of the interval is a numeral value assuming that the primary compression molded product is virtually buried into the mortar as mentioned above.

Example 2

In a primary compression molded product having three layers in the columnar direction and prepared by tablet compression in the columnar direction, the one having a constant diameter (4.50 mm) of the columnar portion and a length in the various columnar directions of 4.90 mm (FIG. 7), 5.20 mm, 5.38 mm, 5.48 mm, respectively, is placed on the lower pestle in the mortar having an elliptic shape with a constant size so that the columnar direction becomes the horizontal direction, and a secondary compression molded product is manufactured by tablet compression with the upper and lower pestles. The shape of the lower-pestle upper face includes a curved shape having the outer edge portion at the upper part, and the one with the length of the trough portion of 5.20 mm formed by curvature is used. At this time, the upper pestle having a projection for giving a scored line is used so that a scored line (24 in FIG. 12) is given at the center line of the tablet. Also, accuracy of the secondary compression is evaluated in percentage of the determination A using displacement of the intermediate layer (3 in FIG. 12) with respect to the position of the scored line as an index (See Table 1). The result is shown in Table 3.

TABLE 3

| Length of primary compression molded product columnar direction | Length of lower-pestle trough portion | Percentage of Determination A |
|---|---|---|
| 4.90 mm (FIG. 7) | 5.20 mm | 83.4% |
| 5.20 mm | 5.20 mm | 96.1% |
| 5.38 mm | 5.20 mm | 83.8% |
| 5.48 mm | 5.20 mm | 73.2% |

If the length of the trough portion of the lower pestle formed by curvature is shorter (−0.30 mm: FIG. 7) or longer (+0.18 mm, +0.28 mm) than the length of the columnar portion of the primary compression molded product, the secondary tablet compression accuracy is lowered.

Example 3

Figure 15:
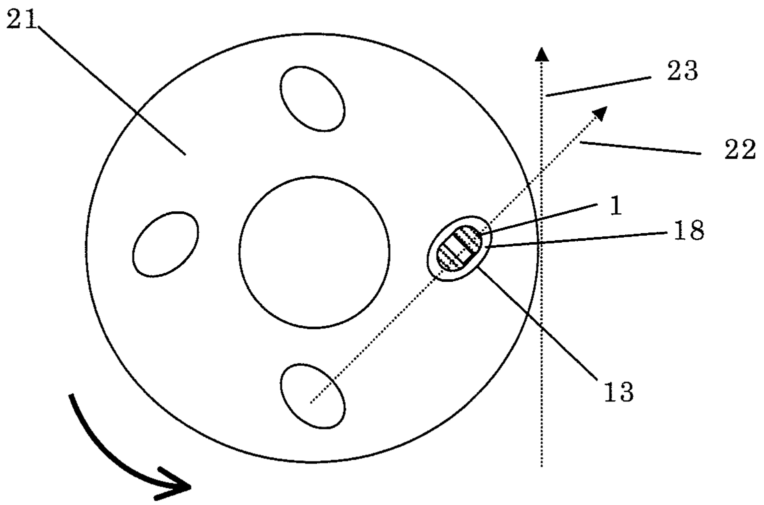
FIG. 15 is a plan view of a rotary tablet compression machine as a comparative example in a third embodiment.
Figure 16:
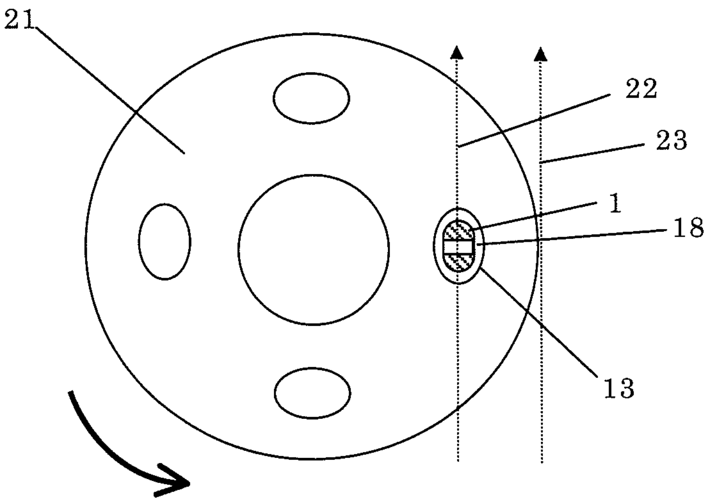
FIG. 16 is a plan view of a rotary tablet compression machine of the present invention in the third embodiment.

Using the rotary tablet compression machine of the present invention in which the mortar is mounted on the turntable, accuracy of the secondary tablet compression is examined by changing the direction of the trough portion of the lower pestle (22 in FIGS. 15 and 16) with respect to the tangent direction of the rotary motion of the turntable (23 in FIGS. 15 and 16). Evaluation of the accuracy is the same as that in Example 1. The result is shown in Table 4.

TABLE 4

| Direction of the trough portion of the lower pestle with respect to the tangent direction of rotary motion | Number of inspected products | Determination A | Determination B | Determination C | Determination D |
|---|---|---|---|---|---|
| Diagonal direction (FIG. 15) | 1,000 pieces | 648 pieces | 318 pieces | 16 pieces | 18 pieces |
| Same direction (FIG. 16) | 1,000 pieces | 834 pieces | 141 pieces | 7 pieces | 18 pieces |

If the mortar used in the present invention is the rotary tablet compression machine mounted on the turntable, by setting the direction of the trough portion of the lower pestle as the tangent direction of the rotary motion of the turntable, accuracy of the secondary tablet compression is improved.

Industrial Applicability

The tablet compression machine of the present invention is used in manufacture of multilayer tablets as drugs.

The invention claimed is:

1. A tablet compression machine capable of manufacturing a tablet having a plurality of layers by applying secondary compression molding to a columnar primary compression molded product which is formed by a plurality of layers and whose two bottom faces may be bulged, wherein the tablet compression machine is capable of manufacturing the tablet according to a method of manufacturing a tablet using a tablet compression machine, wherein the tablet compression machine comprises at least a mortar (13), an upper pestle and a lower pestle (18), said mortar (13) being substantially in a shape in which a part of a flat plate is punched by a closed curve in a direction perpendicular to a plane of the flat plate;

said upper and lower pestles (18) having a shape with an inner face of said mortar, and a space formed by an inner face of said mortar, a lower face of the upper pestle, and upper face of the lower pestle being in a shape of an intended tablet in the secondary compression molding;

a dent formed by the inner face of said mortar and the upper face of the lower pestle being capable of constituting a shape suitable for receiving said primary compression molded product and accepting the primary compression molded product only on the upper face of the lower pestle directly, wherein, in use, a direction of said secondary compression molding is different from the compression molding direction of the primary compression molded product, and wherein the shape of the upper face of said lower pestle (18) includes a curved face so that an outer edge portion comes to an upper part, and wherein the machine is a rotary tablet compression machine in which said lower pestle (18) and a mortar (13) fitted therewith are mounted on a turntable (21), and a direction of a trough portion formed by curvature is a tangent direction of a rotary motion of said turntable (21), wherein the trough portion has directionality, wherein a length of a trough portion formed by a curvature is −1 to 1 mm as compared with the length of the columnar portion of said primary compression molded product, and wherein the method of manufacturing a tablet using a tablet compression machine comprises applying secondary compression molding to a columnar primary compression molded product (1) which is formed by a plurality of layers (2, 3, 4) and whose two bottom faces may be bulged, wherein the direction of said secondary compression molding is different from the compression molding direction of the primary compression molded product.

2. The tablet compression machine according to claim 1, wherein the shape of the upper face of said lower pestle includes an elliptic shape curved so that an outer edge portion in a short diameter direction comes to an upper part and a projection (20) is further provided where the outer edge portions oppose each other.

* * * * *